Figure 3:
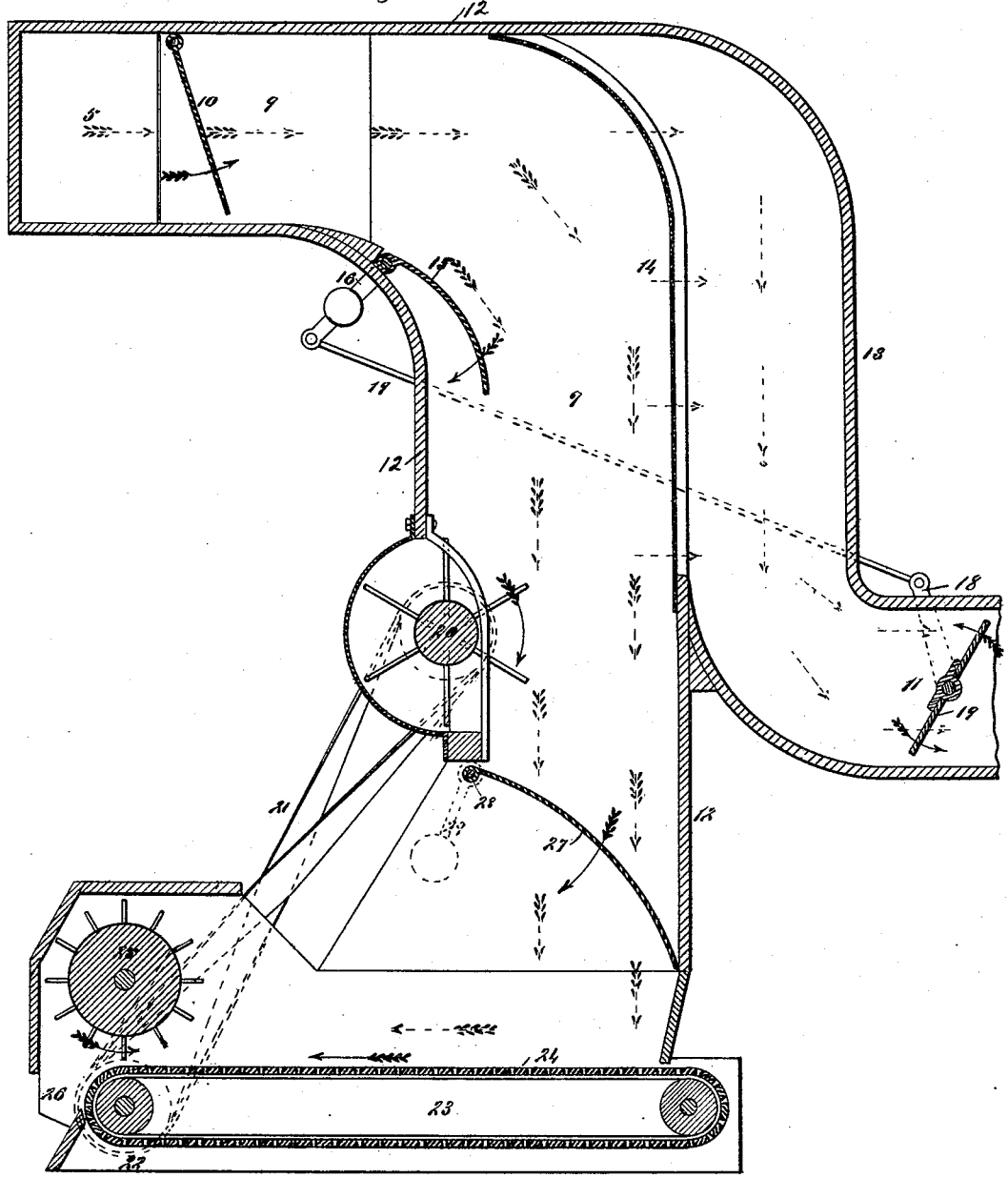

(No Model.) 2 Sheets—Sheet 1.
A. SCHULZE.
SEED COTTON RECEIVER.
No. 478,473. Patented July 5, 1892.
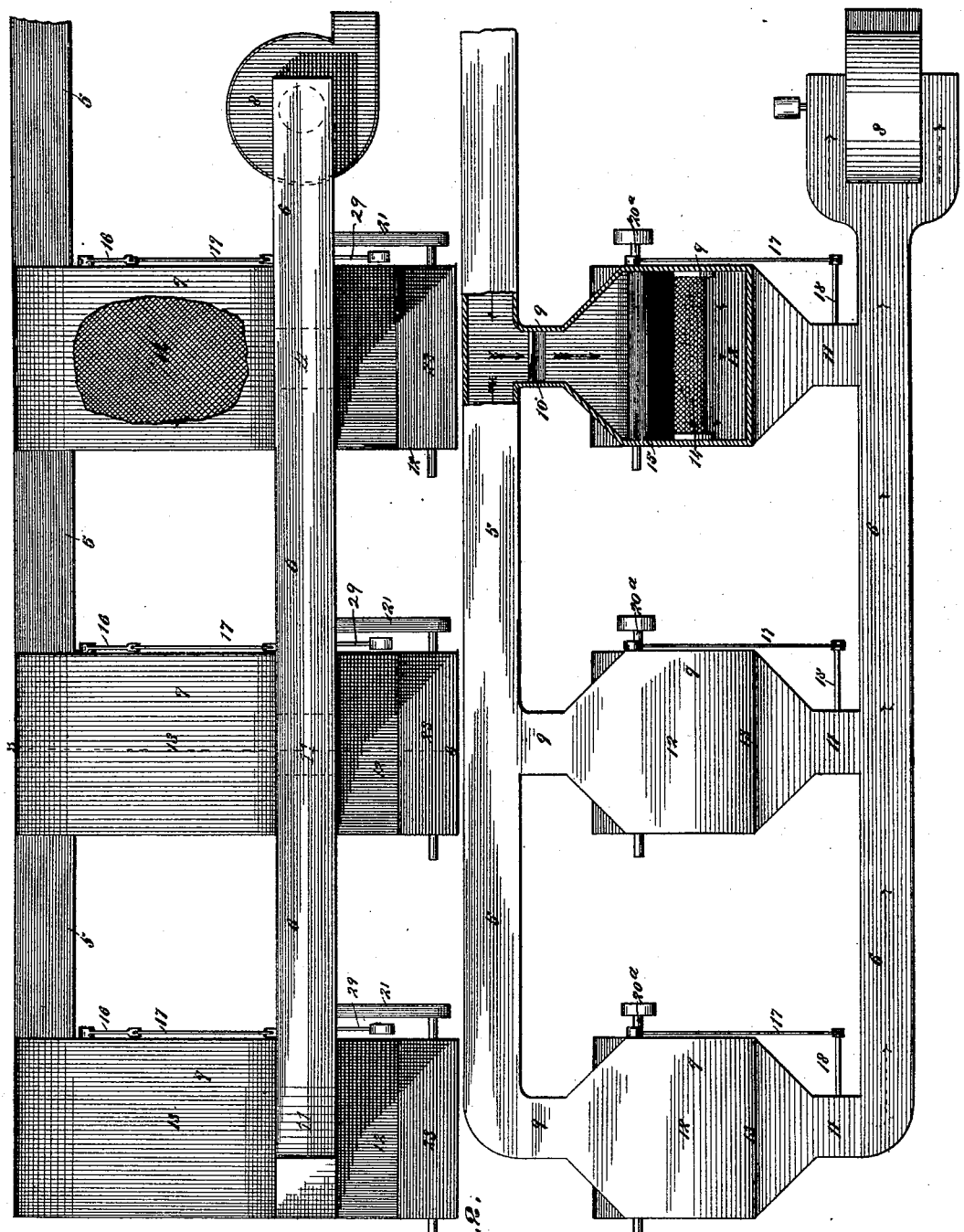
Witnesses:
Charles Pickles.
M. S. Reeder.
Inventor:
Andrew Schulze,
By Fowler & Fowler
Attorneys.

(No Model.) 2 Sheets—Sheet 2.

A. SCHULZE.
SEED COTTON RECEIVER.

No. 478,473. Patented July 5, 1892.

Witnesses:
Charles Pickles
M. S. Reeder

Inventor:
Andrew Schulze,
By Fowler & Fowler
Attorneys

UNITED STATES PATENT OFFICE.

ANDREW SCHULZE, OF TEMPLE, TEXAS.

SEED-COTTON RECEIVER.

SPECIFICATION forming part of Letters Patent No. 478,473, dated July 5, 1892.

Application filed January 16, 1890. Serial No. 337,095. (No model.)

*To all whom it may concern:*

Be it known that I, ANDREW SCHULZE, a citizen of the United States, residing at Temple, in the county of Bell and State of Texas, have invented a certain new and useful Seed-Cotton Receiver, of which the following is such a full, clear, and exact description as will enable any one skilled in the art to which it appertains to make and use the same, reference being had to the accompanying drawings, forming part of this specification.

My invention relates more especially to seed-cotton receivers for delivering seed-cotton to cotton gins or feeders, but may be used for other purposes.

The object of the invention is to supply seed-cotton to one or more gins in a convenient and reliably-operated manner in such a way that a gin or feeder will receive only a certain quantity of cotton or so that each gin will receive only its portion of the seed-cotton, the apparatus being self-regulating.

The invention consists of a seed-cotton receiver for delivering seed-cotton to cotton gins or feeders having automatically-operated mechanism for controlling the quantity of seed-cotton delivered to a gin or feeder or to each gin or feeder where several are used.

By the term "receiver" used herein I include any receptacle or chamber in which the cotton is deposited or received from a cotton-conveying tube before being fed to a gin or feeder.

In the accompanying drawings I have illustrated an apparatus for delivering cotton to a gin or feeder, which apparatus is made in accordance with my invention.

In the said drawings, Figure 1 is an elevation of the same, showing an apparatus for supplying three cotton gins or feeders. Fig. 2 is a plan thereof, illustrating one of the receivers in section; and Fig. 3 is an enlarged vertical section of one of the receivers on the line 3 3 of Fig. 1.

The same figures of reference indicate the same parts throughout the three views.

5 is a trunk, which is adapted to be placed in communication or connection with a wagon or other receptacle containing the seed-cotton, and 6 is another trunk that communicates with the first-mentioned trunk through the receivers 7, through which trunks and receivers air is drawn by an air apparatus 8, driven by any suitable power. Beneath each of the receivers 7 is arranged a cotton gin or feeder which feeds the cotton into a cotton-gin positioned below each of said feeders. The cotton-gins are not shown in the drawings, as they in no way make any part of my invention. The receivers are preferably not connected in series between the trunks—that is, the cotton does not by preference pass through one receiver to reach the other or others—but said receivers are preferably arranged in parallel or what is known as "multiple arc," a term which I adopt herein, it being a similar arrangement to what is known as "multiple arc" in electric circuits. The receivers are similar in every respect, so that I shall only describe the construction of one of the same. The said receivers are taperingly connected by a short section 9 with the trunk 5, in which is arranged a check-valve 10, which prevents back-pressure through the receiver when the air-valve of said receiver is closed in a manner to be explained hereinafter. Each receiver opens taperingly into the trunk 6 through a short section of pipe 11. Between the main trunk 12 of the receiver and the branch pipe 13 thereof, that connects with the short section of pipe 11, which affords communication between the receivers and the trunk 6, I place a screen or net-work 14, through which the air may pass, but through which the cotton cannot pass. I have represented in the drawings the path of the cotton by arrows having a full barb and the path of the air by arrows having no barb.

15 is preferably a hinged flap that is arranged within the main trunk 12 of the receivers and has a weighted arm 16 extending therefrom upon the outside of the apparatus, which arm is connected by a rod 17, pivoted thereto, with an arm 18 of a shut-off valve 19, which is arranged in the section 11, that affords communication between the receivers and the trunk 6. When any one gin or gin-feeder receives more than its share of the seed-cotton, the flap 15 is depressed by the cotton, so as to close the shut-off valve 19 through the instrumentality of the connections just described. This stops the passage of air through such receiver and causes the check-valve 10 to close communication between the said receiver and the main trunk 5, thereby preventing back-pressure through said receiver. It will be noted as several receivers are connected across the trunks that should the shut-off valve 19 in any one receiver be closed and the suction of air through that receiver be stopped, while it continued through the others, this would suck the seed-cotton out of that receiver and carry it into the trunks or other receiver, and thereby cause back-pressure in said receiver. The check-valve 10 prevents this from taking place. As the gin-feeder and gin remove the cotton from the main trunk 12 of the receiver, the flap 15 resumes its normal position and opens the shut-off valve 19, a current of air again opening the check-valve 10 and allowing the cotton to pass into said receiver. The supply of cotton to any receiver is therefore automatic, and no receiver and gin-feeder can receive more than its allotted share of the seed-cotton at the expense of any other receiver, the advantage of which is that several gins can be supplied by one apparatus and no gin can be choked up and injured by receiving more cotton than it ought to and does receive when the cotton gin or feeder is supplied by hand or in any other way.

In order to prevent the cotton from packing in the main trunk 12 of the receiver, I arrange a spiked wheel 20 upon a shaft $20^a$, which is driven by a belt 21 from the pulley 22 of the gin or feeder 23, arranged below the main trunk 12 of the receiver. The said gin or feeder may be of any ordinary type, and said feeder is here shown as having an endless belt 24, which carries the cotton to a spiked wheel 25, that by its rotation discharges the cotton at the point 26 to the cotton-gin.

When the shut-off valve 19 has been closed by means of the flap 15 and its connections and cut off the delivery therethrough, the check-valve closes to prevent back-pressure. As soon now as the flap 15 has resumed its normal position by reason of the main trunk 12 being freed from too much cotton and has opened the shut-off valve 19 so as to allow air to be drawn through the receiver again, air would be drawn by the suction apparatus through the gin or feeder and section of pipe 11 instead of through the trunk 5, section of pipe 9, and receiver, thereby interfering with the operation of the apparatus and leaving the check-valve 10 closed. There would then be an utter failure on the part of the apparatus to draw the cotton into the receiver. To provide against this, I place at the lower part of the main trunk 12 of the receiver a valve 27, which is pivoted at 28, and tends to close by means of a weighted arm 29, rigidly secured thereto and arranged upon the outside of the main trunk 12. This valve and the lower part of the trunk are so made that said valve will allow the cotton to pass by it; but when the lower part of the trunk is more or less free from cotton it will close, and thus prevent the air from being sucked through the gin or feeder and interfering with the operation of the apparatus. It will be understood, of course, that when the lower part of the main trunk 12 of the receiver is filled with cotton and the valve 27 is open, as when the machine is operating, air will not be drawn through the cotton gin or feeder, for the reason that the cotton in the lower part of the trunk 12 of the receiver prevents the passage of air therethrough; but when such part of the apparatus is free from cotton the air will pass through the same and interfere with the operation of the apparatus, as just pointed out, unless prevented from so doing. The valve 27 also incidentally prevents too much cotton from being delivered to the gin or feeder, and thereby tends to keep it from being choked up.

Having now fully set forth my invention, I desire to have it understood that I do not limit myself to the exact arrangement and mechanism described; but What I wish to claim and secure by Letters Patent of the United States as my invention is—

1. The combination, with a cotton-conveyer, of an apparatus for delivering cotton to a gin or feeder, and mechanism governing the delivery of cotton to said gin or feeder, said mechanism consisting of means for arresting the flow of cotton, and a movable member controlled by the cotton connected with said means.

2. The combination, with a cotton-conveyer, of a plurality of apparatus connected therewith in multiple arc for delivering cotton to gins or feeders, and mechanism governing the delivery of cotton to each gin or feeder, said mechanism consisting of means for arresting the flow of cotton, and a movable member controlled by the cotton connected with each means.

3. An apparatus for delivering seed-cotton to gins or feeders, having air-passages, a plurality of receivers connected therewith, means for causing a circulation of air in said passages and receivers to carry the cotton to said gins or feeders, and valves for automatically controlling the quantity of cotton delivered to each of said receivers.

4. An apparatus for delivering seed-cotton to gins or feeders, having air-passages and a plurality of receivers connected therewith in parallel or multiple arc, means for causing a circulation of air in said passages and receivers to carry the cotton to said gins or feeders, and valves for automatically controlling the quantity of cotton delivered to each of said receivers.

5. An apparatus for delivering seed-cotton to a gin or feeder, having air-passages and a receiver with means for causing a circulation of air therethrough to carry the cotton to said gin or feeder, a valve controlling the passage of air through said receiver, and a movable member controlling said valve, automatically operated by the pressure of the cotton.

6. An apparatus for delivering seed-cotton to a gin or feeder, having air-passages and a receiver with means for causing a circulation of air therethrough to carry the cotton to said gin or feeder, a shut-off valve controlling the passage of air through said receiver, and a hinged flap arranged within the path of the cotton, having suitable connections with said valve for governing the same.

7. An automatic seed-cotton-delivery apparatus having receivers or chambers connected with gins or feeders, a cotton-conveying pneumatic tube connected in multiple arc with said apparatus, and valve mechanism interposed between the pneumatic tube and each receiver for preventing back-pressure of air from the receiver to the pneumatic tube, but allowing the passage of air and cotton from the pneumatic tube to the receiver.

8. An apparatus for delivering seed-cotton to a gin or feeder, having air-passages and a receiver with means for causing a circulation of air therethrough to carry the cotton to said gin or feeder, a shut-off valve controlling the passage of air through said receiver, regulating means for said shut-off valve, automatically operated by the pressure of the cotton, and a check-valve controlled by the passage of air through said air-passages and receiver for preventing back-pressure therethrough.

9. An apparatus for delivering seed-cotton to a gin or feeder, having air-passages and a receiver with means for causing a circulation of air therethrough to carry the cotton to said gin or feeder, a shut-off valve controlling the passage of air through said receiver, a hinged flap arranged within the path of the cotton, having suitable connections with said shut-off valve for governing the same, and a check-valve controlled by the passage of air through said air-passages and receiver for preventing back-pressure therethrough.

10. An automatic seed-cotton-delivery apparatus having a cotton-conveying pneumatic tube, a receiver or chamber suitably connected therewith and with a gin or feeder, and valve mechanism interposed between the receiver and the gin or feeder for preventing back-pressure of air from the gin or feeder to the receiver, but allowing the passage of cotton from the receiver to the gin or feeder.

11. An apparatus for delivering seed-cotton to a gin or feeder, having air-passages and a receiver with means for causing a circulation of air therethrough to carry the cotton to said gin or feeder, a shut-off valve controlling the passage of air through said receiver, regulating means for said shut-off valve, automatically operated by the pressure of the cotton, and a cut-off valve arranged between the receiver and gin or feeder within the path of the cotton and adapted to cut off air communication between said gin or feeder and said receiver, for the purpose described.

12. An apparatus for delivering seed-cotton to a gin or feeder, having air-passages and a receiver with means for causing a circulation of air therethrough to carry the cotton to said gin or feeder, a shut-off valve controlling the passage of air through said receiver, regulating means for said shut-off valve, automatically operated by the pressure of the cotton, a check-valve controlled by the passage of air through said air-passages and receiver for preventing back-pressure therethrough, and a cut-off valve arranged between said receiver and the gin or feeder to cut off air communication between said gin or feeder and said receiver.

13. An apparatus for delivering seed-cotton to a gin or feeder, having air-passages and a receiver with means for causing a circulation of air therethrough to carry the cotton to said gin or feeder, a shut-off valve controlling the passage of air through said receiver, a hinged flap arranged within the path of the cotton, having suitable connections with said shut-off valve for governing the same, a check-valve controlled by the passage of air through said air-passages and receiver for preventing back-pressure therethrough, and a cut-off valve arranged between said receiver and the gin or feeder to cut off air communication between said gin or feeder and said receiver.

14. An apparatus for delivering seed-cotton to a gin or feeder, having air-passages and a receiver with means for causing a circulation of air therethrough to carry the cotton to said gin or feeder, a shut-off valve controlling the passage of air through said receiver, regulating means for said shut-off valve, automatically operated by the pressure of the cotton, and a screen interposed between said shut-off valve, and the receiver for permitting the passage therethrough of air, but preventing the passage of cotton through the same.

15. An apparatus for delivering seed-cotton to a gin or feeder, having air passages and a receiver with means for causing a circulation of air therethrough to carry the cotton to said gin or feeder, a shut-off valve controlling the passage of air through said receiver, a hinged flap arranged within the path of the cotton, having suitable connections with said shut-off valve for governing the same, a check-valve controlled by the passage of air through said air-passages and receiver for preventing back-pressure therethrough, a screen interposed between the said shut-off valve and the receiver for permitting the passage therethrough of air, but preventing the passage of cotton through the same, a cut-off valve arranged between said receiver and the gin or feeder to cut off air communication between said gin or feeder and said receiver, and a spiked wheel arranged in said receiver for preventing the choking of the cotton therein.

In testimony whereof I have hereunto set my hand and affixed my seal, this 9th day of January, 1890, in the presence of the two subscribing witnesses.

ANDREW SCHULZE. [L. S.]

Witnesses:
 A. C. FOWLER,
 M. S. REEDER.